US008988561B2

(12) United States Patent
Yamauchi

(10) Patent No.: US 8,988,561 B2
(45) Date of Patent: Mar. 24, 2015

(54) IMAGING APPARATUS HAVING TEMPERATURE SENSOR WITHIN IMAGE SENSOR WHEREIN APPARATUS OUTPUTS AN IMAGE WHOSE QUALITY DOES NOT DEGRADE IF TEMPERATURE INCREASES WITHIN IMAGE SENSOR

(75) Inventor: Makiko Yamauchi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 752 days.

(21) Appl. No.: 13/095,774

(22) Filed: Apr. 27, 2011

(65) Prior Publication Data

US 2011/0199519 A1 Aug. 18, 2011

Related U.S. Application Data

(63) Continuation of application No. 11/925,442, filed on Oct. 26, 2007, now Pat. No. 7,952,621.

(30) Foreign Application Priority Data

Dec. 4, 2006 (JP) .................................. 2006-327194

(51) Int. Cl.
*H04N 9/64* (2006.01)
*H04N 5/369* (2011.01)
*H04N 5/361* (2011.01)
*H04N 5/367* (2011.01)

(52) U.S. Cl.
CPC ............. *H04N 5/3696* (2013.01); *H04N 5/361* (2013.01); *H04N 5/367* (2013.01)
USPC .......................................................... 348/243

(58) Field of Classification Search
CPC ..... H04N 5/357; H04N 5/3575; H04N 5/361; H04N 5/363; H04N 5/365; H04N 5/378
USPC ............... 348/208.1, 241, 243, 244, 245, 246
See application file for complete search history.

(56) References Cited

U.S. PATENT DOCUMENTS

| 5,508,740 | A * | 4/1996 | Miyaguchi et al. ........... 348/244 |
| 6,342,921 | B1 * | 1/2002 | Yamaguchi et al. .......... 348/322 |
| 6,515,285 | B1 * | 2/2003 | Marshall et al. .............. 250/352 |
| 6,610,984 | B2 * | 8/2003 | Knauth et al. ................ 250/352 |
| 6,730,909 | B2 * | 5/2004 | Butler ........................ 250/338.1 |
| 6,974,973 | B2 * | 12/2005 | Rossi et al. ...................... 257/72 |
| 7,129,985 | B1 * | 10/2006 | Koizumi et al. .............. 348/372 |
| 7,235,773 | B1 * | 6/2007 | Newman ................... 250/214 C |
| 7,381,964 | B1 * | 6/2008 | Kump et al. ............. 250/370.11 |
| 7,489,883 | B2 * | 2/2009 | Rossi et al. ...................... 399/44 |

(Continued)

FOREIGN PATENT DOCUMENTS

JP 7087284 B 9/1991
JP 11-126894 A 5/1999

(Continued)

*Primary Examiner* — Nicholas Giles
(74) *Attorney, Agent, or Firm* — Canon U.S.A., Inc. IP Division

(57) ABSTRACT

An imaging apparatus includes an image sensor that comprises a pixel portion having a plurality of pixel sensors configured to generate an image signal, and a plurality of temperature sensors disposed in an area of the pixel portion and configured to generate a temperature signal corresponding to a detected temperature, and a correction unit configured to correct the image signal from the plurality of image sensors according to the temperature detected by the plurality of temperature sensors.

10 Claims, 12 Drawing Sheets

(56) References Cited

U.S. PATENT DOCUMENTS

| | | | |
|---|---|---|---|
| 7,692,820 B2* | 4/2010 | Rogalski et al. | 358/406 |
| 7,787,033 B2* | 8/2010 | Rossi et al. | 348/244 |
| 7,952,621 B2* | 5/2011 | Yamauchi | 348/243 |
| 7,956,909 B2* | 6/2011 | Takahashi et al. | 348/243 |
| 2002/0057349 A1* | 5/2002 | Yamaguchi et al. | 348/222 |
| 2003/0107661 A1* | 6/2003 | Pahr et al. | 348/244 |
| 2006/0038900 A1* | 2/2006 | Tay | 348/243 |
| 2006/0109360 A1* | 5/2006 | Sakai et al. | 348/300 |
| 2007/0097242 A1* | 5/2007 | Oshima | 348/312 |
| 2008/0007641 A1* | 1/2008 | Pahr et al. | 348/308 |
| 2011/0199519 A1* | 8/2011 | Yamauchi | 348/244 |

FOREIGN PATENT DOCUMENTS

| | | |
|---|---|---|
| JP | 2005-217771 A | 8/2005 |
| JP | 2006-033036 A | 2/2006 |
| JP | 2007-019820 A | 1/2007 |

* cited by examiner

IMAGING APPARATUS HAVING TEMPERATURE SENSOR WITHIN IMAGE SENSOR WHEREIN APPARATUS OUTPUTS AN IMAGE WHOSE QUALITY DOES NOT DEGRADE IF TEMPERATURE INCREASES WITHIN IMAGE SENSOR

CROSS REFERENCE TO RELATED APPLICATIONS

The present application is a continuation of U.S. patent application Ser. No. 11/925,442, filed on Oct. 26, 2007, entitled "IMAGING APPARATUS HAVING TEMPERATURE SENSOR WITHIN IMAGE SENSOR WHEREIN APPARATUS OUTPUTS AN IMAGE WHOSE QUALITY DOES NOT DEGRADE IF TEMPERATURE INCREASES WITHIN IMAGE SENSOR", the content of which is expressly incorporated by reference herein in its entirety. This application also claims the benefit of Japanese Application No. 2006-327194 filed Dec. 4, 2006, which is hereby incorporated by reference herein in its entirety.

BACKGROUND OF THE INVENTION

1. Field of the Invention

The present invention relates to an imaging apparatus configured to capture an object image.

2. Description of the Related Art

An imaging apparatus such as a digital still camera and a video camera generally uses, as its image sensor, a charge-coupled device (CCD) image sensor or a complementary metal oxide semiconductor (CMOS) image sensor.

As a characteristic of the above-described image sensor, a fixed pattern noise due to an uneven dark current in a photodiode per each pixel and a defect pixel due to a dark current can occur. These phenomena degrades a quality of a captured image.

The level of a dark current is generally said to rise twice as high when a temperature of a surface of an image sensor rises by 8° C. That is, the fixed pattern noise due to an uneven dark current in a photodiode per each pixel and the defect pixel due to a dark current have temperature characteristics. Accordingly, fixed pattern noises or defect pixels occur more frequently when the temperature of the surface of an image sensor rises.

Japanese Patent Application Laid-Open No. 01-147973 discusses a method for suppressing a fixed pattern noise caused by a dark current in a photodiode that has the temperature characteristics as described above. More specifically, Japanese Patent Application Laid-Open No. 01-147973 discusses a method for correcting a fixed pattern noise by previously storing a fixed pattern noise per each predetermined temperature range, detecting a temperature of an image sensor, reading a fixed pattern noise corresponding to the detected temperature, and subtracting the fixed pattern noise from a signal of an actual captured image.

In addition, a conventional method stores an address of a defect pixel caused by a dark current and interpolates defect pixel information based on information about pixels around the defect pixel. Furthermore, defect pixels can also be corrected by previously storing an address of a defect pixel for each predetermined temperature range, similar to Japanese Patent Application Laid-Open No. 01-147973.

Moreover, another conventional method performs an imaging operation immediately before or after the actual imaging operation, in a state that an entire image sensor is shielded from light. Thus, a captured image including only dark current elements is obtained and subtracted from a signal of an actual captured image. As a result, degradation of an image quality due to a fixed pattern noise caused by a dark current which includes a temperature variation factor, or defect pixels arising from a dark current, can be reduced or suppressed (correction by an actual dark subtraction).

Further, Japanese Patent Application Laid-Open No. 2001-174329 discusses a method for suppressing or reducing a fixed pattern noise by detecting a temperature around an image sensor, based on an average value in an optical black area of the image sensor. The method discussed in Japanese Patent Application Laid-Open No. 2001-174329 is highly useful in the case where the entire image sensor shows a uniform temperature variation.

However, it is possible that only the temperature of a part of an image sensor rises because of a partial temperature rise in inner circuits within the image sensor or peripheral circuits around the image sensor. In such a case, the dark current level in the portion of the image sensor where temperature is high is different from the portion of the image sensor where temperature is low. Accordingly, a fixed pattern noise cannot be appropriately and effectively suppressed or reduced. Furthermore, in this case, an image quality of a captured image can degrade due to uneven brightness or uneven color arising from a difference in dark current levels on the surface of the image sensor.

In addition, in the above case where the temperature is uneven within (on the surface of) the image sensor, if the entire surface of the image sensor is corrected according to a defect pixel address for each predetermined temperature range as in the method discussed in Japanese Patent Application Laid-Open No. 01-147973, a portion of the image can be excessively corrected or insufficiently corrected.

In most cases, defect pixels are corrected by interpolating defect pixel information with information about surrounding pixels. In the case where the image is excessively corrected, when a minute pattern is captured, the reproducibility of the pattern generally degrades. In the case where the image is insufficiently corrected, noises can more distinctly appear in the image, which causes image degradation.

In recent years, an image sensor has a large number of pixels, and accordingly, a chip size of an image sensor has also become larger. Some of imaging apparatuses such as a digital still camera, which are required from the market to achieve a high image quality, have a chip size equal to an image taking area of a 35 mm film in a silver halide camera. In such a large-sized image sensor, uneven brightness, uneven color, and defect pixels become increasingly apparent.

Furthermore, in making correction by the actual dark subtraction, two shootings are performed when one scene is captured. Thus, a time taken for capturing one scene becomes twice as long. Accordingly, a frame rate in a video camera and continuous shooting performance of a digital still camera can considerably degrade.

SUMMARY OF THE INVENTION

The present invention is directed to an imaging apparatus capable of outputting an image whose quality does not degrade even if temperature partially increases within an image sensor.

According to an aspect of the present invention, an imaging apparatus is provided that includes an image sensor that has a pixel portion having a plurality of pixel sensors configured to generate an image signal, and a plurality of temperature sensors disposed in an area of the pixel portion and configured to generate a temperature signal corresponding to a detected temperature, and a correction unit configured to correct the image signal from the plurality of image sensors according to the temperature detected by the plurality of temperature sensors.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principle of the invention.

DETAILED DESCRIPTION OF THE EMBODIMENTS

Various exemplary embodiments, features, and aspects of the present invention will now herein be described in detail with reference to the drawings. It is to be noted that the relative arrangement of the components, the numerical expressions, and numerical values set forth in these embodiments are not intended to limit the scope of the present invention unless it is specifically stated otherwise.

First Exemplary Embodiment

Figure 1:
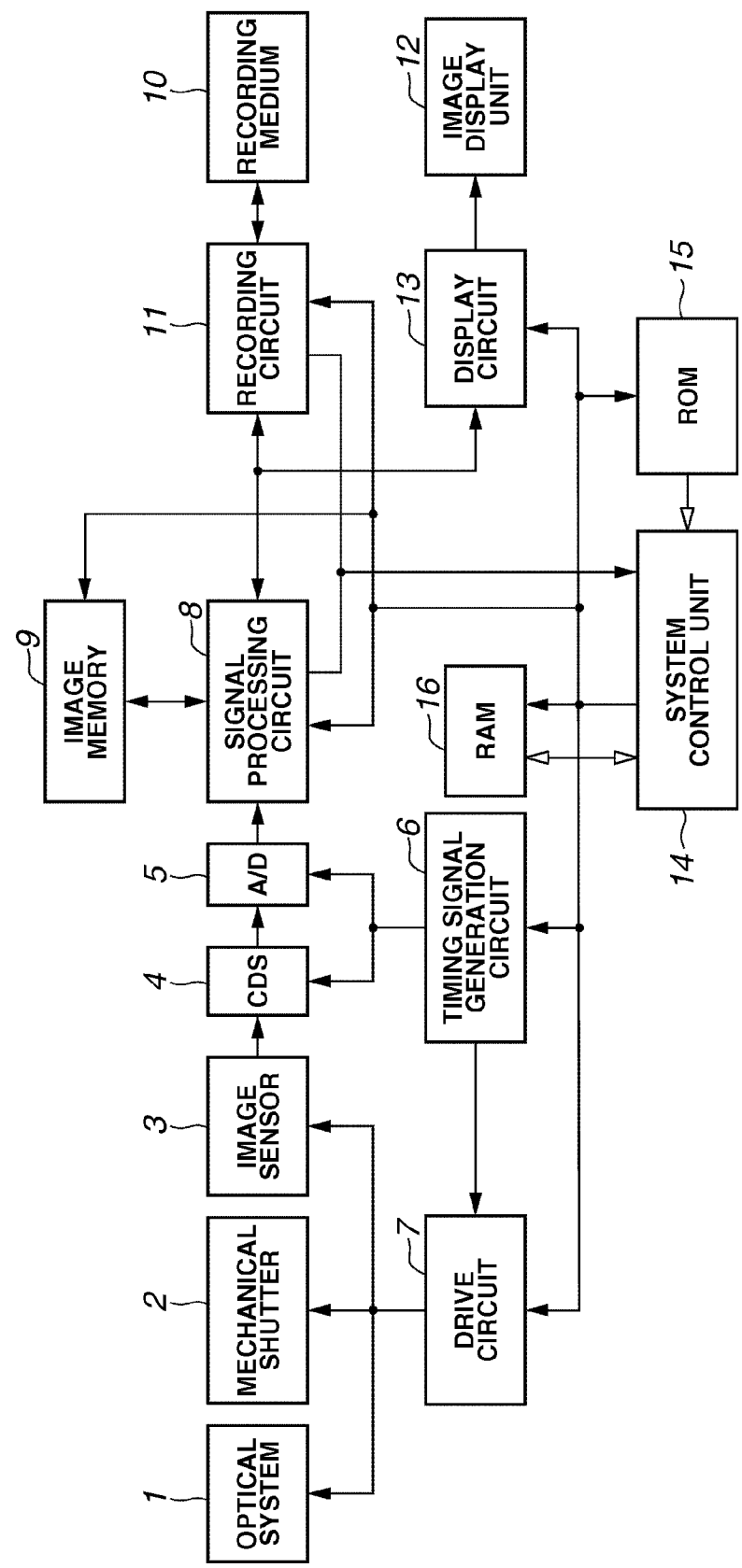
FIG. 1 illustrates an example of a configuration of an imaging apparatus according to a first exemplary embodiment of the present invention.

Now, a first exemplary embodiment of the present invention will be described below. FIG. 1 illustrates an example of an imaging apparatus according to a first exemplary embodiment of the present invention.

Referring to FIG. 1, the imaging apparatus includes an optical system 1 that includes a lens and a diaphragm. Further, the imaging apparatus includes a mechanical shutter 2 and an image sensor 3. A correlated double sampling (CDS) circuit 4 performs processing on an analog signal. An analog/digital (A/D) converter 5 converts an analog signal into a digital signal. A timing signal generation circuit 6 generates a signal for operating the image sensor 3, the CDS circuit 4 and the A/D converter 5.

A drive circuit 7 drives the optical system 1, the mechanical shutter 2, and the image sensor 3. A signal processing circuit 8 performs necessary signal processing on photographed image data. An image memory 9 stores signal-processed image data. An image recording medium 10 can be removed from the imaging apparatus. A recording circuit 11 records the signal-processed image data on the recording medium 10. An image display unit 12 displays the signal-processed image data.

A display circuit 13 displays an image on the image display unit 12. A system control unit 14 controls the entire imaging apparatus. A non-volatile memory (read-only memory (ROM)) 15 stores a program describing a control method performed by the system control unit 14, control data such as a parameter and a table used in executing the program, and correction data for a defect pixel address.

The system control unit 14 reads the program, the control data, and the correction data stored on the ROM 15 and loads the read program, control data, and correction data on a volatile memory (random access memory (RAM)) 16, to control the entire imaging apparatus.

Now, a shooting operation (image capturing method) using the mechanical shutter 2 in the imaging apparatus having the above-described configuration will be described below.

When the imaging apparatus is powered on before performing a shooting operation, the system control unit 14 reads a necessary program, control data, and correction data from the ROM 15 and loads the read program, control data, and correction data onto the RAM 16, to start the shooting operation. The program and data are used when the system control unit 14 controls the imaging apparatus.

Moreover, the system control unit 14, as necessary, loads from the ROM 15 onto the RAM 16 an additional program or data or directly reads data stored on the ROM 15. When the shooting operation is started, the optical system 1, after receiving a control signal from the system control unit 14, drives the diaphragm and the lens to form an object image having an appropriate degree of lightness, on the image sensor 3.

Then, based on the control signal from the system control unit 14, the mechanical shutter 2 is driven so that the mechanical shutter 2 shields the image sensor 3 from light in synchronization with the operation of the image sensor 3, to achieve a necessary exposure time. In this case, if the image sensor 3 has an electronic shutter function, the electronic function can be used together with the mechanical shutter 2 to secure a necessary exposure time.

The image sensor 3 is driven by a drive pulse based on an operation pulse generated by the timing signal generation circuit 6 which is under control of the system control unit 14. The image sensor 3 photoelectrically converts the object image into an electrical signal, and outputs a resulting signal as an analog image signal.

The CDS circuit 4, based on the operation pulse generated by the timing signal generation circuit 6 under control of the system control unit 14, removes a clock-synchronous noise from the analog image signal. Then, the A/D converter 5 converts the analog image signal into a digital image signal.

Next, the signal processing circuit 8, under control of the system control unit 14, performs image processing such as color conversion, white balance correction and gamma correction, resolution conversion processing, and image compression/decompression processing on the digital image signal.

The image memory 9 is used for temporarily storing the digital image signal that is currently processed or image data, which includes a processed digital image signal. The recording circuit 11 converts the image data processed by the signal processing circuit 8 and the image data stored on the image memory 9 into data having a format suited for the image recording medium 10 (e.g., file system data having a hierarchical structure), and then stores the converted image data on the image recording medium 10.

In addition, the image data is transferred to the display circuit 13 after having been subjected to the resolution conversion processing in the signal processing circuit 8. The display circuit 13 converts the received image data into a signal appropriate to the image display unit 12 (e.g., an analog signal having National Television System Committee (NTSC) format). Then, the image display unit 12 displays the converted image signal.

The signal processing circuit 8 can output directly to the image memory 9 or the recording circuit 11 the digital signal as image data without performing signal processing on the digital image signal according to a control signal from the system control unit 14. The signal processing circuit 8, when requested from the system control unit 14, outputs information about the digital image signal or the image data generated during the signal processing, or information extracted from the information about the digital image signal or the image data, to the system control unit 14.

The above-described information includes, for example, information about a spatial frequency of an image, an average value in a designated area of an image, and a data amount of a compressed image. Furthermore, the recording circuit 11, when requested from the system control unit 14, outputs information about a type and remaining space of the image recording medium 10 to the system control unit 14.

Now, a reproduction operation performed when image data is recorded on the image recording medium 10 will be described below.

Based on a control signal from the system control unit 14, the recording circuit 11 reads image data from the image recording medium 10. Then, the signal processing circuit 8, according to a control signal from the system control unit 14, performs image decompression processing if the read image data is compressed. The decompressed image data is then stored on the image memory 9.

The image data stored on the image memory 9 is subjected to resolution conversion processing in the signal processing circuit 8. Then, the image data whose resolution has been converted is transferred to the display circuit 13. The display circuit 13 converts the image data into a signal appropriate to the image display unit 12. The image display unit 12 displays the converted image signal.

Figure 2:
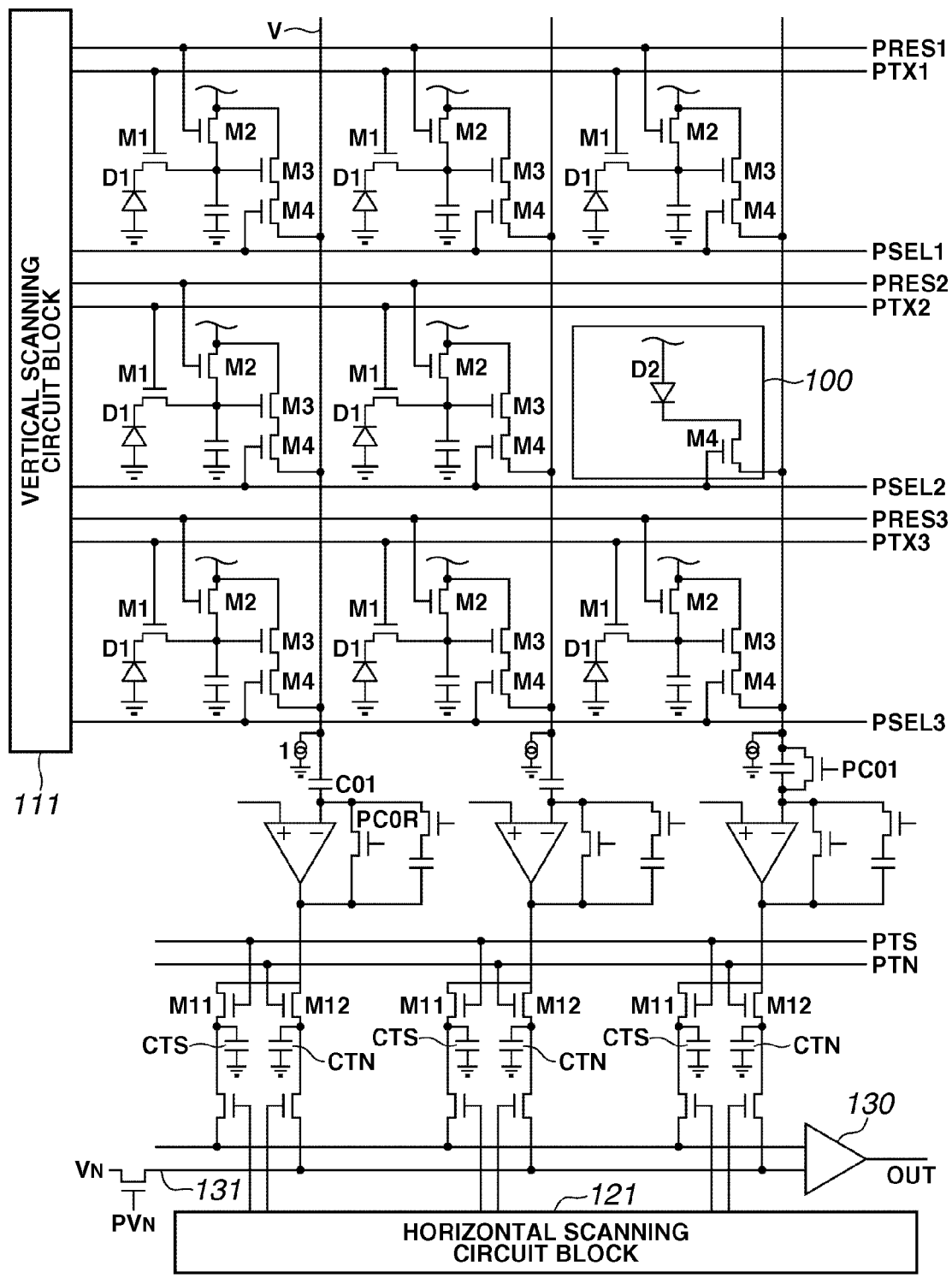
FIG. 2 is a circuit diagram illustrating an example of a CMOS area sensor according to the first exemplary embodiment of the present invention.

FIG. 2 is a circuit diagram illustrating an example of a pixel portion of the CMOS area sensor 3 according to the first exemplary embodiment of the present invention.

Referring to FIG. 2, an ordinary pixel generally includes a photodiode D1, a transfer switch M1, a reset switch M2, a pixel amplifier M3, and a row selection switch M4.

A gate of the transfer switch M1 is connected to a signal PTX from a vertical scanning circuit 111. A gate of the reset switch M2 is connected to a signal PRES from the vertical scanning circuit 111. A gate of the row selection switch M4 is connected to a signal PSEL from the vertical scanning circuit 111.

A thermometer pixel 100 includes a temperature sensor D2 and a row selection switch M4. A gate of the row selection switch M4 is connected to a signal PSEL from the vertical scanning circuit 111. The pixel portion includes a plurality of photodiodes (image sensors) D1 that generate a plurality of image signals. The temperature sensor D2 detects a temperature level.

Figure 7:
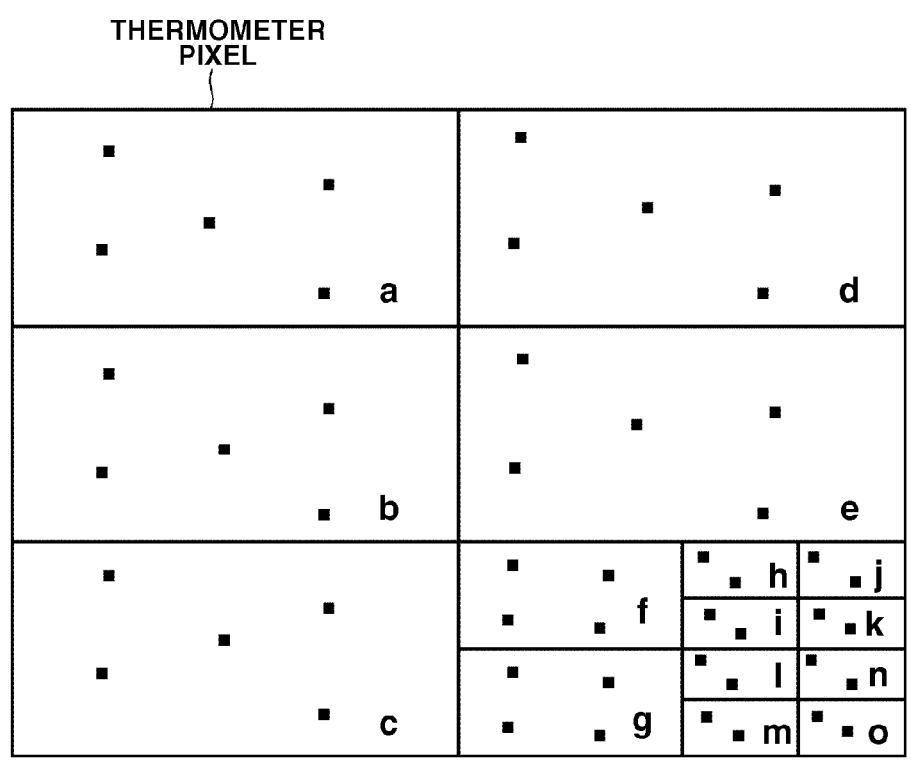
FIG. 7 illustrates exemplary divided areas in the CMOS area sensor according to the first exemplary embodiment of the present invention.

A plurality of temperature sensors D2 of the thermometer pixel 100 is provided within an area of the pixel portion, as illustrated in FIG. 7. The temperature sensor D2 is provided in a part of a matrix of the photodiodes D1. The temperature sensor D2 is connected to the same selection line PSEL 2 as the photodiode D1.

Now, timing of an operation of the CMOS area sensor 3 according to the first exemplary embodiment of the present invention will be described below. The CMOS area sensor 3 performs signal accumulation, reading of an image signal, and reading of a temperature signal, in this order.

Figure 3:
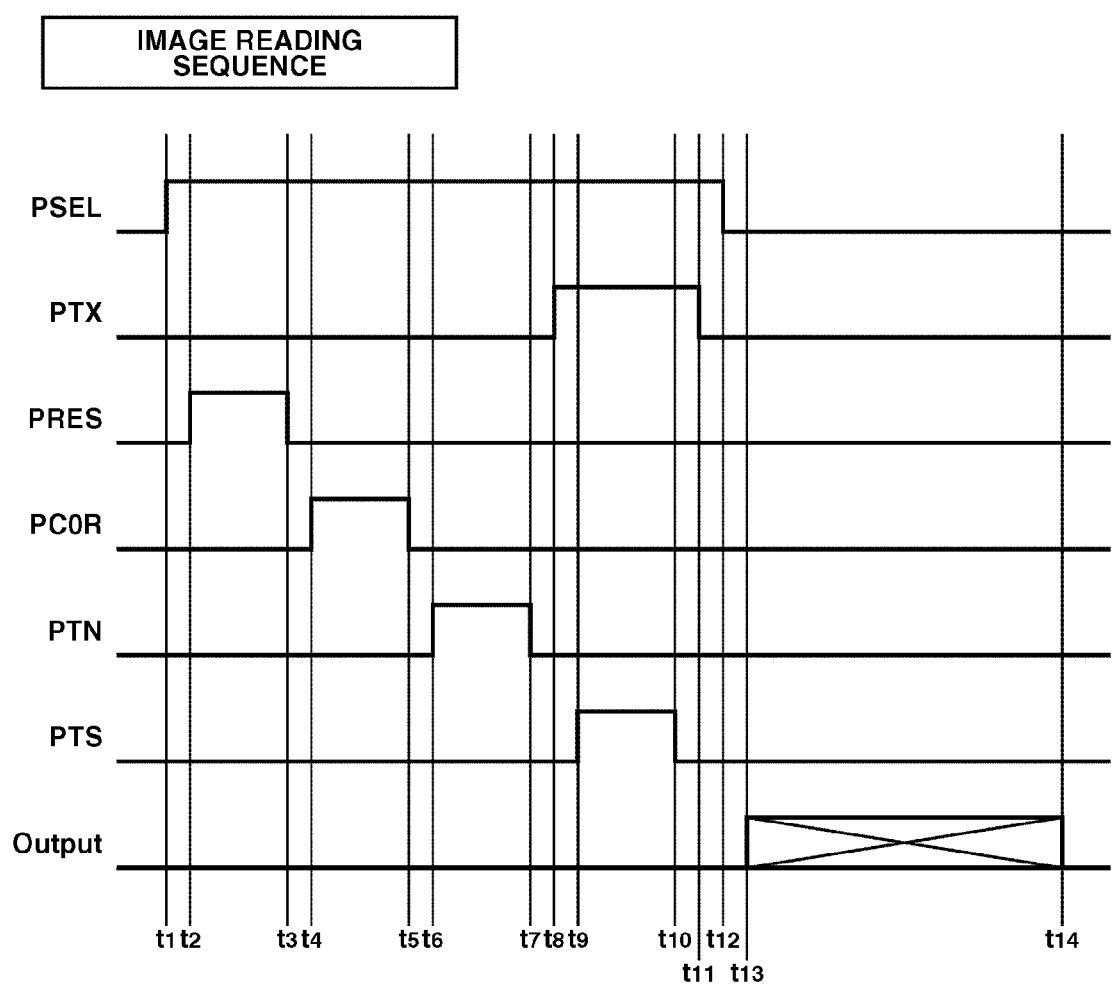
FIG. 3 is a timing chart illustrating exemplary timing for an image reading sequence performed by the CMOS area sensor according to the first exemplary embodiment of the present invention.

FIG. 3 is a timing chart illustrating exemplary operation timing for reading an image signal with the CMOS area sensor 3 in FIG. 2 according to the present exemplary embodiment. When the accumulation of optical electric charges in the photodiode D1 is completed and thus electrical charges are accumulated in the photodiode D1, the CMOS area sensor 3 starts reading an image signal per each line. That is, the CMOS area sensor 3 reads an (N−1)-th line after reading an N-th line.

During a time period from a time t1 to a time t12, the signal PSEL(n) is active, the row selection switch M4 is turned on, and a source follower circuit including the pixel amplifier M3 for all pixels connected to an n-th line is operable.

During a time period from a time t2 to a time t3, a signal PRES(n) is active, the reset switch M2 is turned on, and a gate of the source follower including the pixel amplifier M3 is initialized. That is, a signal of the dark level is output to the vertical output line V. Subsequently, during a time period from a time t4 to a time t5, a clamp pulse PC0R is active and the signal of the dark level is clamped to a capacitor C01.

Then, during a time period from a time t6 to a time t7, a signal PTN is active, a transfer gate M12 is turned on, and the dark level signal is held in a noise signal holding capacitor CTN. The above-described operation is performed in parallel in all the pixels connected to the N-th line.

When the dark level signal is completely transferred to the noise signal holding capacitor CTN, a signal PTX is active during a time period from a time t8 through a time t11. Thus, the transfer switch M1 is turned on. Thus, the signal charges accumulated in the photodiode D1 is transferred to a gate of the source follower including the pixel amplifier M3.

At this time, at the gate of the source follower including the pixel amplifier M3, the potential varies from a reset level by an amount equivalent to the transferred signal charges. Thus, the signal level is finally determined.

During a time period from a time t9 to a time t10, a signal PTS is active, a transfer gate M11 is turned on, and the signal level is held in a signal holding capacitor CTS. The above-described operation is performed in parallel in all the pixels connected to the N-th line. Here, the noise signal holding capacitor CTN and the signal holding capacitor CTS respectively hold a dark level and a signal level of all the pixels connected to the N-th line.

Now referring back to FIG. 2, a differential circuit 131 is connected to a differential amplifier 130. The differential amplifier 130 calculates a difference between the dark level and the signal level, between the pixels. According to the calculated difference between the dark level and the signal level, the differential amplifier 130 cancels a fixed pattern noise caused by uneven threshold voltage Vth of the source follower and a KTC noise generated by the reset switch M2 during resetting.

Thus, a signal showing a high signal-to-noise (S/N) ratio from which a noise component is removed, can be obtained. Here, only a dark current component generated due to a defect on a surface of the photodiode D1 is output from a pixel in which the photodiode D1 is optically shielded.

A horizontal scanning circuit 121 horizontally scans the differential signal between the dark level held in the noise signal holding capacitor CTN and the signal level held in the optical signal holding capacitor CTS. Then, the resulting signals are serially output at timing from a time t13 to a time t14. Thus, the output for the N-th line is completed.

Similar to the N-th line, the signals PSEL (n+1), PRES (N+1), PTX(n+1), PTN, and PTS are driven as illustrated in FIG. 3. Thus, a signal for an (N+1)-th line can be read. After the image reading sequence, a temperature reading sequence is performed.

Figure 4:
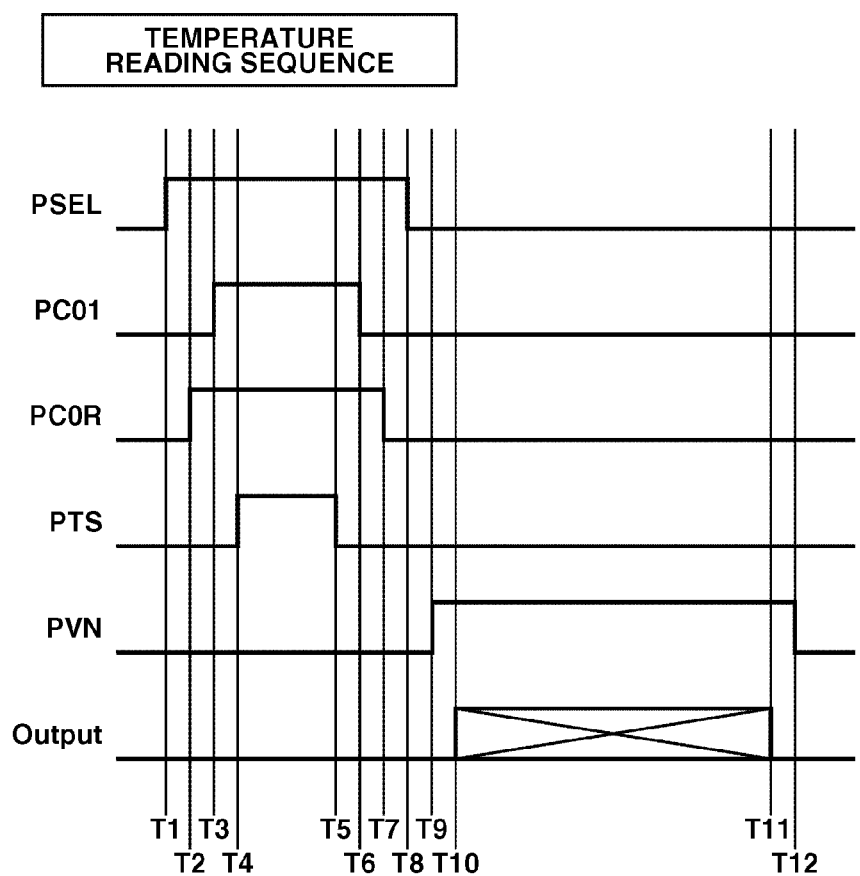
FIG. 4 is a timing chart illustrating exemplary timing for a temperature reading sequence performed by the CMOS area sensor according to the first exemplary embodiment of the present invention.

FIG. 4 is a timing chart illustrating operation timing for reading a temperature signal by the CMOS area sensor 3 illustrated in FIG. 2 according to the present exemplary embodiment.

Referring to FIG. 4, during a time period from a time T1 to a time T8, the signal PSEL (n) is active, the row selection switch M4 is turned on, and an output from the temperature sensor D2, which is connected to the N-th line, is output to the vertical output line V.

Subsequently, during a time period from a time T2 to a time T7, the clamp pulse PC0R is active, and the signal PC01 is active during a time period from a time T3 to a time T6. During a time period from a time t4 to a time T5, the signal PTS is active, the transfer gate M11 is turned on, and the signal level of the temperature sensor D2 is held in the signal holding capacitor CTS.

During a time period from a time T9 to a time T12, a signal PVN is active. The differential amplifier 130 calculates a difference signal between a reference voltage VN and the signal held in the signal holding capacitor CTS and horizontally scans the resulting difference signal with the horizontal scanning circuit 121. Then, the resulting signals are serially output at timing from a time t10 to a time t11. Thus, the output of the temperature data of the thermometer pixel 100 arranged on the N-th line is completed.

Similar to the N-th line, the signals PSEL(n+1), PC0R, PC01, PTS, and PVN are driven as illustrated in FIG. 4. Thus, a signal from the thermometer pixel on an (N+1)-th line can be read.

In the present exemplary embodiment, the image reading sequence and the temperature reading sequence are performed in this order after the signal accumulation period. However, the signals can also be accumulated after the temperature reading sequence is completed, and then the image reading sequence can be performed.

The differential amplifier 130 is a common amplifier that amplifies the pixel signal generated by the photodiode (image sensor) D1 and the signals detected by the temperature sensor D2.

The image reading sequence and the temperature reading sequence are performed at different timing. That is, the differential amplifier 130 outputs the signal of the plurality of pixels generated by the photodiode (image sensor) D1 and outputs the signal for the plural temperatures generated by the temperature sensor D2 at different timing.

Figure 5:
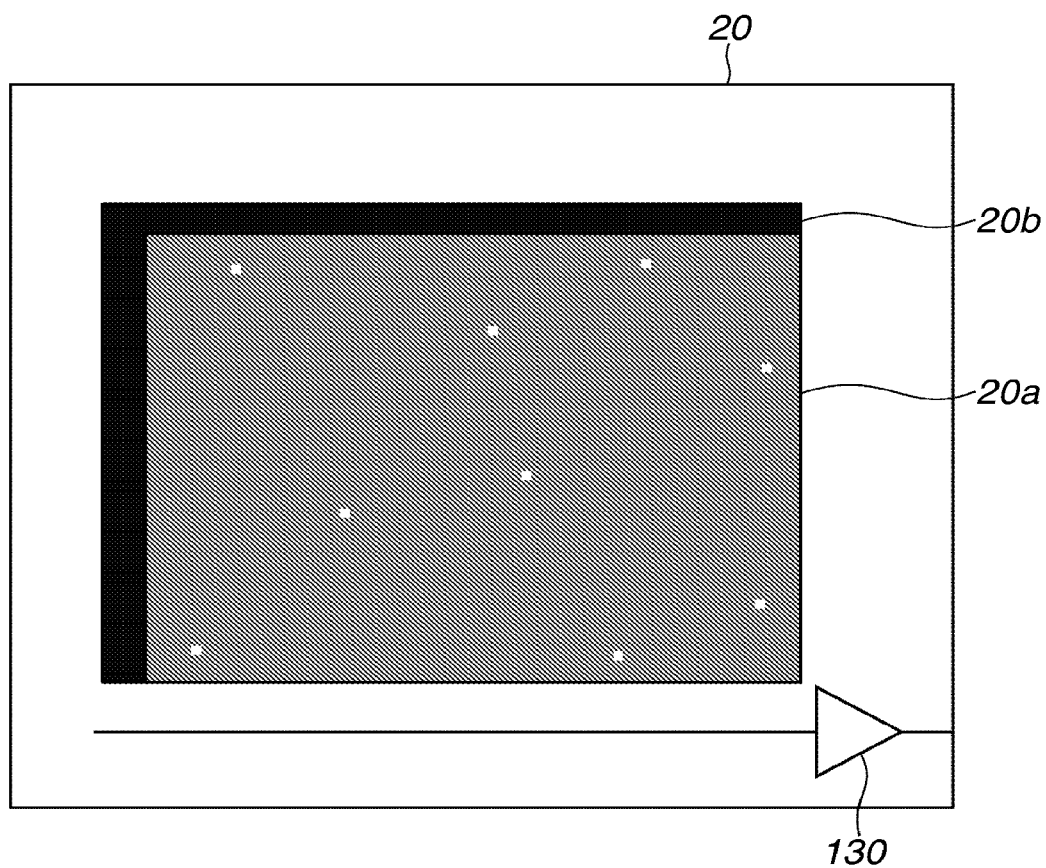
FIG. 5 schematically illustrates an example of a chip of the CMOS area sensor in FIG. 2 according to the first exemplary embodiment of the present invention.

FIG. 5 illustrates an example of a chip 20 of the CMOS area sensor 3 illustrated in FIG. 2 according to the present exemplary embodiment. The chip 20 includes an effective pixel portion 20a and an optical black (OB) portion 20b, in which the pixel portion is optically shielded. The differential amplifier 130 amplifies the signal from each of the signal holding capacitor CTS (FIG. 2) and the noise signal holding capacitor CTN (FIG. 2) and outputs the amplified signal.

FIG. 5 also illustrates an image output from the CMOS area sensor 3 in FIG. 2. In the example in FIG. 5, a uniform brightness surface of the image is slightly underexposed. In the example in FIG. 5, a defect pixel, which appears due to a dark current, is described as a white spot in one part of the effective pixel portion 20a.

Figure 6:
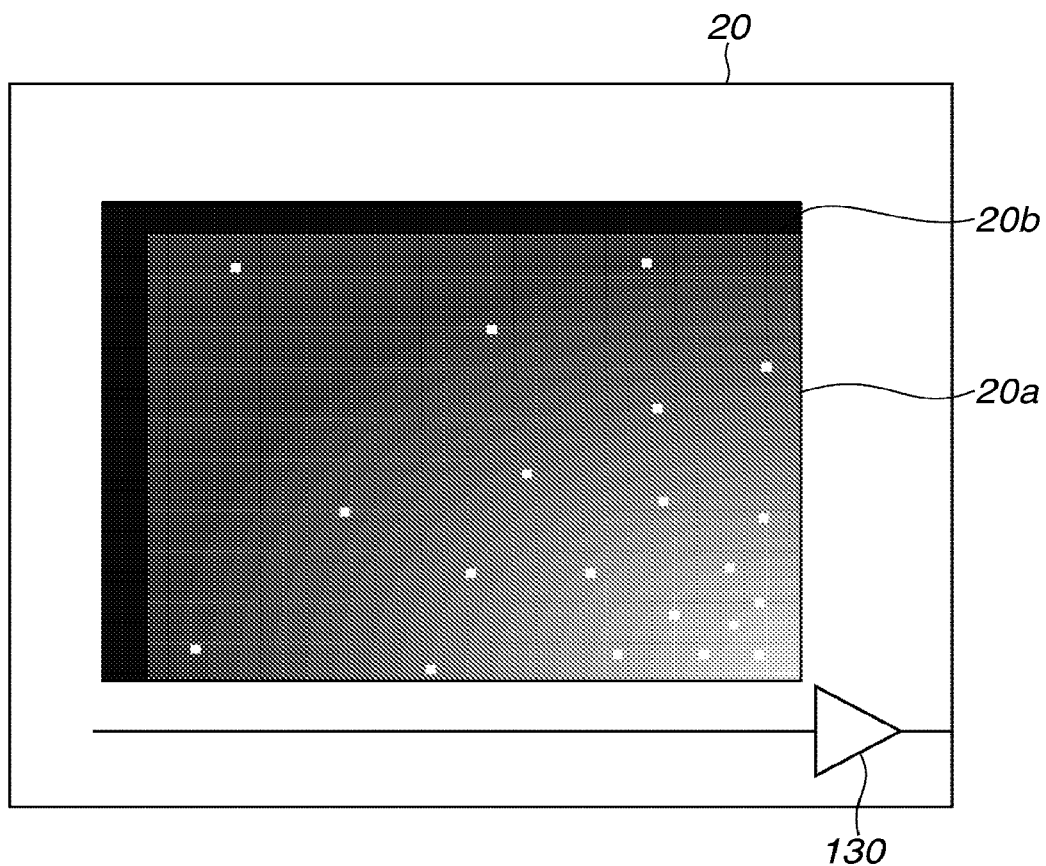
FIG. 6 illustrates in detail an example of a chip of the CMOS area sensor in FIG. 2 according to the first exemplary embodiment of the present invention.

In addition to FIG. 5, FIG. 6 illustrates an exemplary state of a defect pixel, which appears due to uneven brightness, uneven color, and a dark current caused by high temperature when the differential amplifier 130 operates.

Since the temperature is higher around the differential amplifier 130, the surface brightness level is apparently higher and a larger number of defect pixels appear due to the dark current. However, in the portion distant from the differential amplifier 130, the amount of dark current is relatively small, and thus the brightness level is lower and only a relatively small number of defect pixels appear.

The effective pixel portion 20a of the chip 20 of the CMOS area sensor 3 includes a plurality of temperature sensors that measures the temperature of a plural portions in the chip 20. The temperature sensors incorporated in the chip 20 utilizes temperature characteristics of a negative-positive-negative (NPN) transistor and a diode, which can be manufactured by an image sensor manufacturing process and are arranged on the same substrate as the CMOS area sensor 3. The temperature sensors are disposed in the pixel portions of the CMOS area sensor 3. The pixel including the temperature sensor is shielded from light.

In the example illustrated in FIG. 7, the pixel portion is divided into areas a through o. The temperature sensor D2 is provided in the divided areas a through o. Each of the areas a through o includes one or more temperature sensor (s) D2. An average value measured by the thermometer pixel (the temperature sensor D2) included in the divided areas a through o is used as an average temperature of each portion.

An area of the pixel portion close to the differential amplifier 130 has a larger number of divided areas than the pixel portion distant from the differential amplifier 130. In addition, a larger number of temperature sensors D2 are provided in an area close to the differential amplifier 130 per unit area than in an area distant from the differential amplifier 130.

Figure 8:
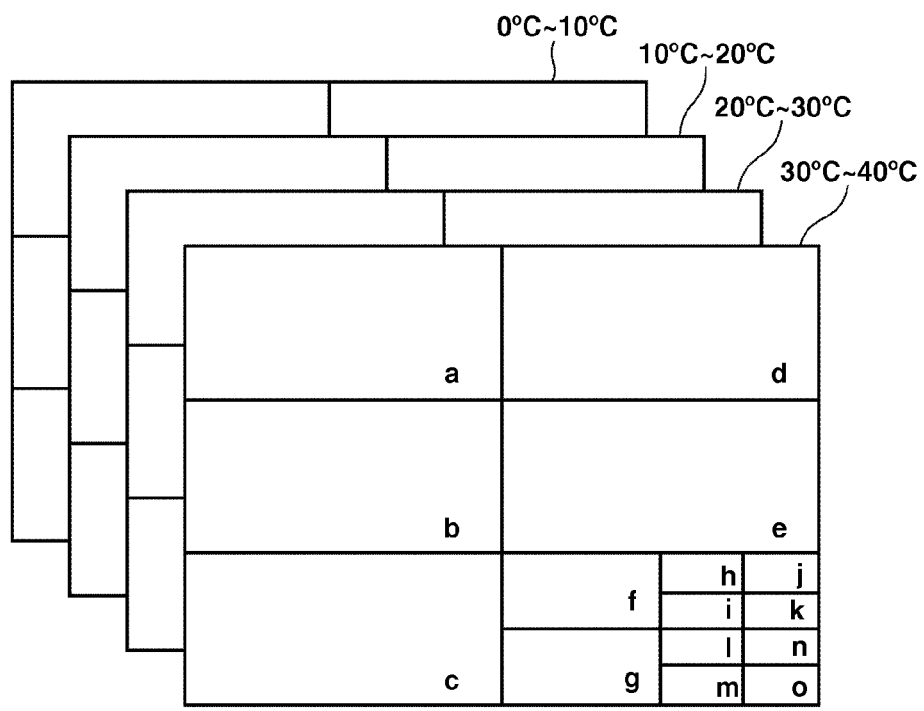
FIG. 8 illustrates an example of a table of a defect pixel address per each temperature level according to the first exemplary embodiment of the present invention.

FIG. 8 illustrates an example of a table of defect pixel addresses for each temperature level. The table illustrated in FIG. 8 is provided per each of the divided areas a through o (FIG. 7).

That is, by appropriately using the tables of defect pixel addresses for each pixel portion temperature (FIG. 8), excessive correction or insufficient correction of defect pixels can be prevented even if the temperature of the pixel portions of the CMOS area sensor 3 is uneven. Thus, an optimum correction can be achieved.

On the other hand, in order to address uneven brightness on the surface of the CMOS area sensor 3, a table of dark current values measured according to temperature can be used. The temperature of the areas a through o is measured as described with reference to FIGS. 7 and 8. Then, the dark current level for each pixel is calculated based on the measured temperature and the dark current value according to the temperature held in the table.

By subtracting the dark current component from each pixel output, the noise correction can be optimally performed even if the temperature of the pixel portions of the CMOS area sensor 3 is uneven. Thus, degradation of image quality caused by uneven brightness or uneven color can be prevented.

The signal processing circuit 8 includes a correction unit for correcting signals of pixels generated by the pixel sensors (photodiodes) D1 according to the temperature detected by temperature sensors D2. The correction unit includes the table of defect pixels (FIG. 8) or the table of dark current values (FIG. 8). The correction unit uses the table to correct the defect pixels or the dark current. In addition, the correction unit performs the correction per each of the divided areas a through o.

The number of the temperature sensors and the number of the divided areas of the entire pixels are not limited to those described above. If the number of temperature sensors or divided areas of the entire pixels is increased, the correction can be more accurately performed. In the present exemplary embodiment, the CMOS area sensor 3 is used. However, the type of the image sensor is not limited to the CMOS area sensor. That is, the image sensor can also be a CCD area sensor or other appropriate area sensor.

Second Exemplary Embodiment

Figure 9:
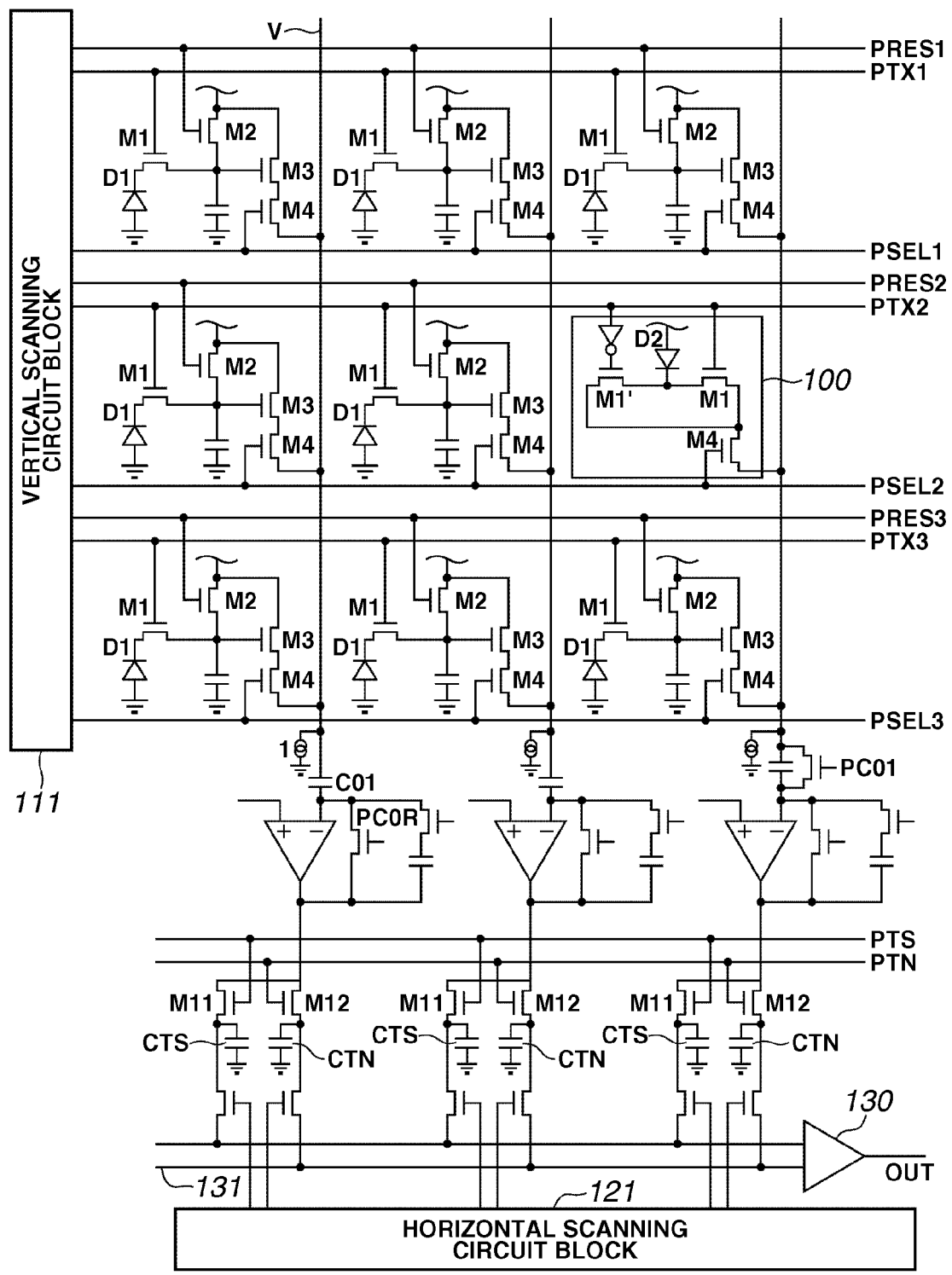
FIG. 9 is a circuit diagram illustrating an example of a CMOS area sensor according to a second exemplary embodiment of the present invention.

Now, a second exemplary embodiment of the present invention will be described below. FIG. 9 is a circuit diagram illustrating an example of the CMOS area sensor 3 according to the second exemplary embodiment of the present invention. In FIG. 9, the components similar to those in FIG. 2 are provided with the same reference numerals and symbols as those in FIG. 2. Accordingly, the detailed description thereof is not repeated here.

Referring to FIG. 9, the thermometer pixel 100 includes the temperature sensor D2, the transfer switch M1, a transfer switch M1', and the row selection switch M4. A gate of the row selection switch M4 is connected to a signal PSEL from the vertical scanning circuit 111.

The switch PC01 (FIG. 2) and the switch for the signal PVN are not necessary in the example in FIG. 9. The other components are similar to those in the first exemplary embodiment.

In the present exemplary embodiment, when the signal PTX is active, the transfer switch M1 is turned on, and a temperature signal is output to the vertical output line V. In the other cases, the transfer switch M1' is turned on and the reference voltage VN is output.

Accordingly, the image signal and the temperature data can be simultaneously read after accumulating optical signals by performing the image reading sequence, which is described with reference to FIG. 3.

Third Exemplary Embodiment

Figure 10:
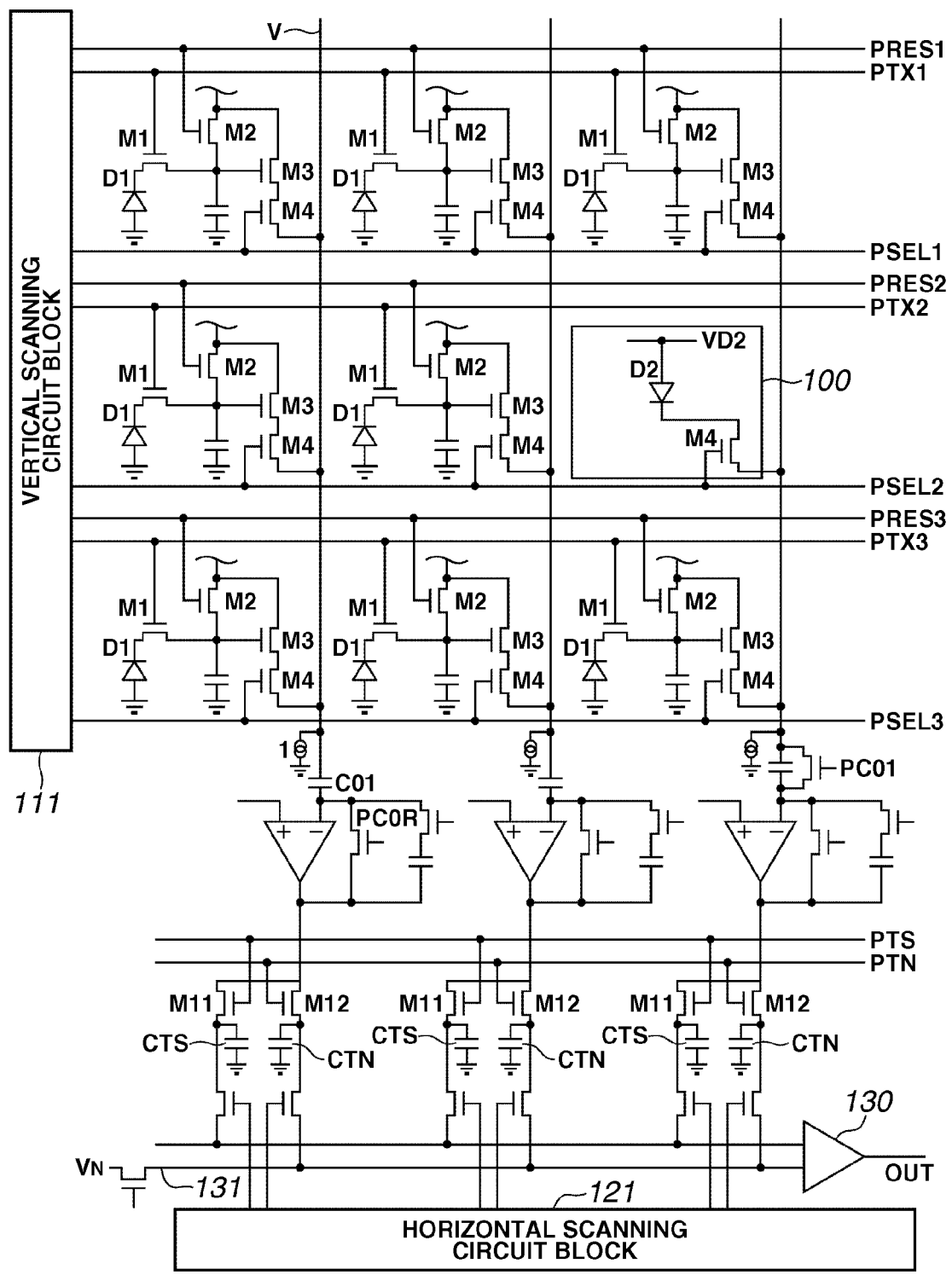
FIG. 10 is a circuit diagram illustrating an example of a CMOS area sensor according to a third exemplary embodiment of the present invention.

Now, a third exemplary embodiment of the present invention will be described below. FIG. 10 is a circuit diagram illustrating an example of the CMOS area sensor 3 according to the third exemplary embodiment of the present invention.

Referring to FIG. 10, power supplied to the temperature sensor D2 of the thermometer pixel 100 is controlled based on a power source voltage VD2. The other components of the present exemplary embodiment are similar to those in the first exemplary embodiment. The components similar to those in the first exemplary embodiment are provided with the same reference numerals and symbols. Accordingly, the description thereof is not repeated here.

By performing the image reading sequence (FIG. 11) and the temperature reading sequence (FIG. 12), the power source voltage VD2 for the thermometer pixel is turned off during a time period for accumulating and reading image signals. The power source voltage VD2 for the thermometer pixel is turned on only when the temperature signal is output. Accordingly, a degradation of image quality due to a spontaneous emission of the temperature sensor can be prevented.

Figure 11:
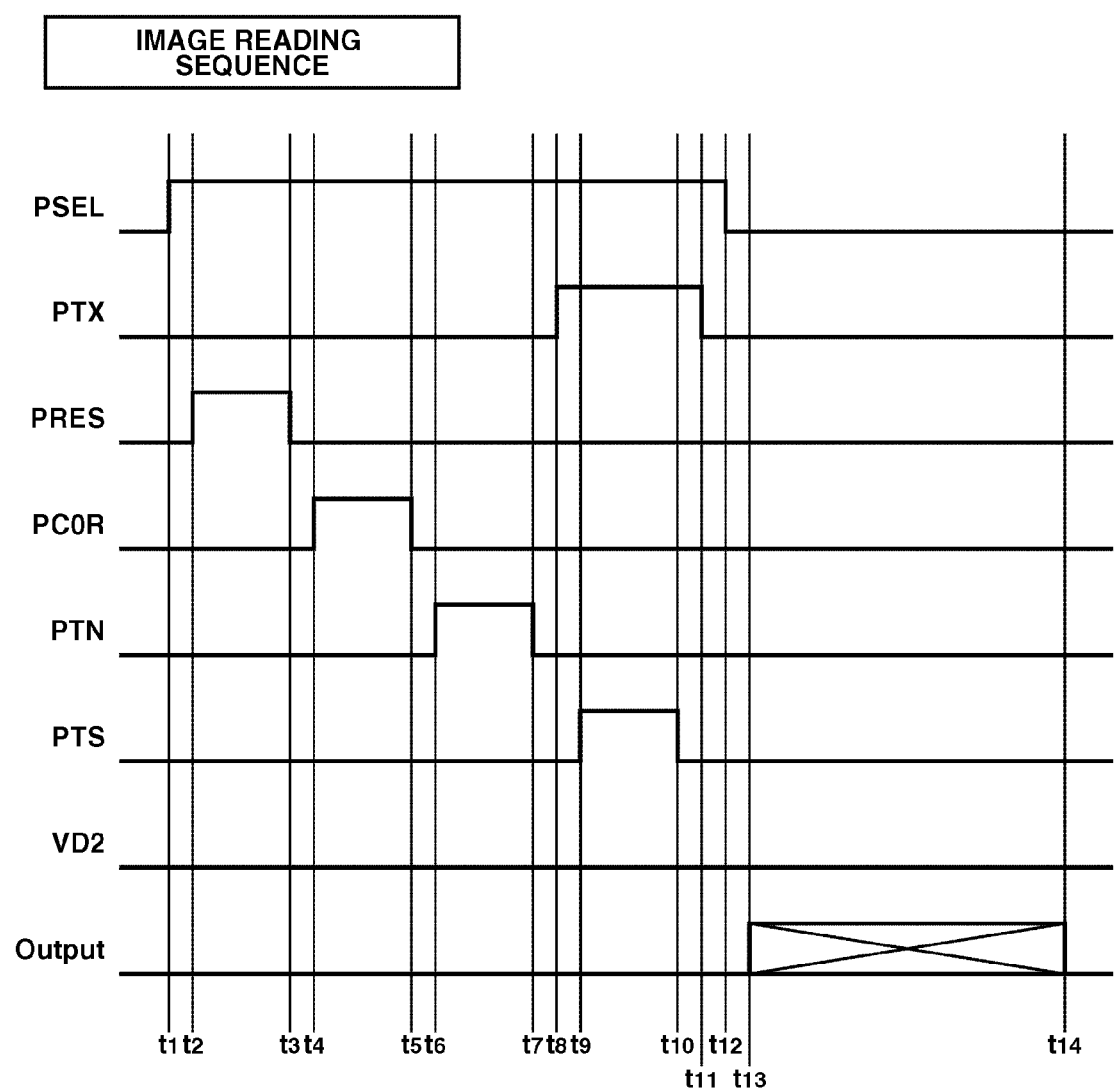
FIG. 11 is a timing chart illustrating exemplary timing for an image reading sequence performed by the CMOS area sensor according to the third exemplary embodiment of the present invention.
Figure 12:
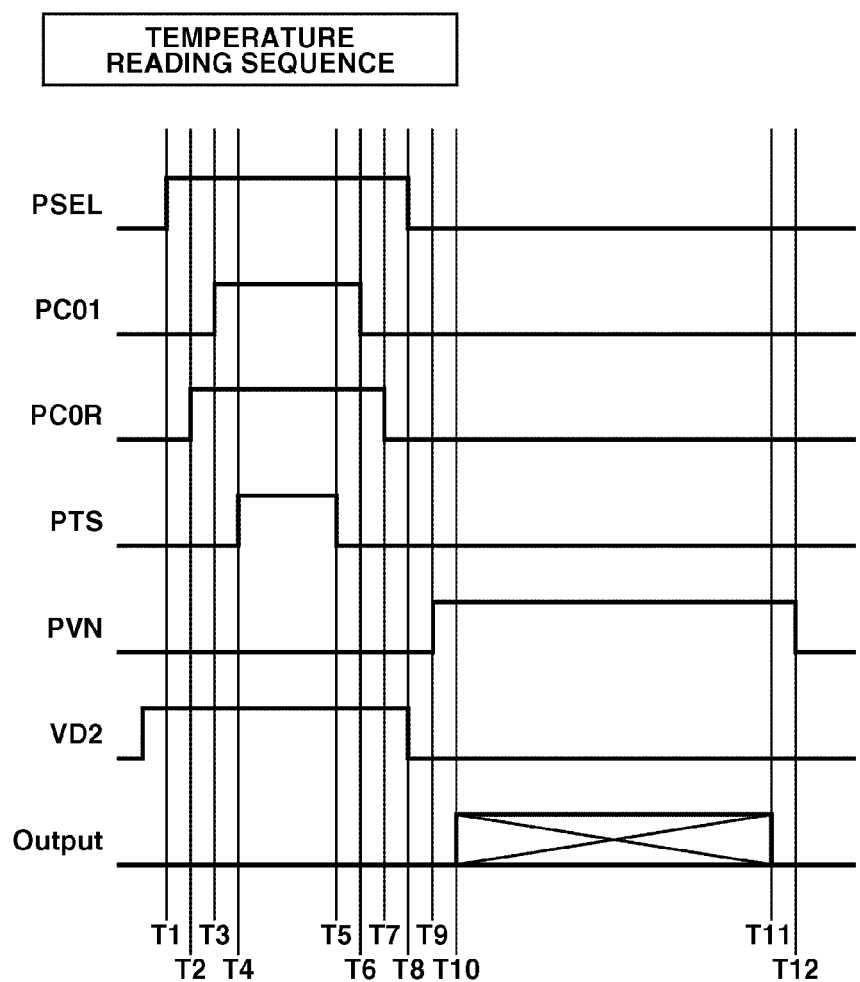
FIG. 12 is a timing chart illustrating exemplary timing for a temperature reading sequence performed by the CMOS area sensor according to the third exemplary embodiment of the present invention.

FIG. 11 illustrates an example of an image reading sequence according to the present exemplary embodiment, which corresponds to the image reading sequence illustrated in FIG. 3. FIG. 12 illustrates an example of a temperature reading sequence according to the present exemplary embodiment, which corresponds to the temperature reading sequence illustrated in FIG. 4.

The power source voltage VD2 is turned on (to a positive, for example) during a period from the time T1 to the time T9 (the time period for the temperature reading sequence in FIG. 2), and is turned off (to a ground voltage, for example) during other time periods.

The power source voltage VD2 is supplied to the temperature sensor D2 when the differential amplifier 130 outputs a temperature signal generated by the temperature sensor D2. On the other hand, the power source voltage VD2 is not supplied to the temperature sensor D2 when the differential amplifier 130 outputs a pixel signal generated by the photodiode D1.

According to the above-described first through third exemplary embodiments, if the temperature is uneven on the surface of the CMOS area sensor 3, uneven brightness, uneven color, and defect pixels can be effectively corrected using the plurality of temperature sensors disposed around the CMOS area sensor 3.

In the above-described exemplary embodiments, the temperature sensors are disposed in the pixel portion of the CMOS area sensor 3. More specifically, the temperature sensors are disposed within a plurality of pixels in the CMOS area sensor 3 instead of photodiodes. The pixels including the temperature sensors are used as thermometer pixels for measuring the temperature in close proximity to each pixel of the CMOS area sensor 3.

A correction value for output from the CMOS area sensor 3 is changed according to a result of the temperature measured by the plurality of temperature sensors, so that the output from the CMOS area sensor 3 can be effectively corrected. More specifically, a correction value for the defect pixel in the CMOS area sensor 3 is used as the correction value for the output, so that the defect pixel caused by a dark current in the CMOS area sensor 3 can be effectively corrected.

In addition, a correction value for the dark current in the CMOS area sensor 3 is used as the correction value for the output, so that uneven brightness and uneven color can be effectively corrected. Furthermore, in correcting a defect pixel, it is useful to vary the correction value for the defect pixel for each of the areas obtained by dividing the pixel portion of the CMOS area sensor 3 so that more accurate defect pixel correction can be made.

In dividing the pixel portion of the CMOS area sensor 3 into a plurality of areas, the number of the divided areas is larger around the differential amplifier 130 which can generate high temperature in the CMOS area sensor 3, than in portions distant from the differential amplifier 130.

In addition, it is useful to dispose a large number of temperature sensors around the differential amplifier 130 to more accurately measure the temperature of the area where temperature can vary over a wide range.

Furthermore, in the above-described exemplary embodiments, the signal from the temperature sensor is read at timing different from the timing for accumulating and reading an ordinary pixel signal. The temperature sensor is powered off during time periods except the period for reading the signals. Accordingly, a degradation of image quality due to a spontaneous emission of the temperature sensor can be prevented.

As the temperature sensor for the above-described exemplary embodiments, an NPN transistor or a diode is used that can be manufactured by an image sensor manufacturing process and is disposed instead of a photodiode. Thus, the temperature characteristics of the NPN transistor or the diode can be utilized in the above-described exemplary embodiments.

The signal from the thermometer pixel is read at timing different from the timing for accumulating and reading an ordinary pixel signal. The thermometer is powered off during time periods except the time period for reading the signals from the thermometer pixel. Accordingly, a degradation of image quality occurring due to a spontaneous emission from the thermometer pixel can be prevented. As described above, the imaging apparatus using the CMOS image sensor 3 can improve a quality of a captured image.

According to the above-described first through third exemplary embodiments, if the temperature is uneven on the surface of the image sensor, uneven brightness, uneven color, and defect pixels can be effectively corrected using the plurality of temperature sensors disposed around the pixel portion of the image sensor. The correction value for a defect pixel in the image sensor and the correction value for a dark current in the image sensor are changed according to a result of the temperature measurement using the temperature sensors.

Thus, even if the temperature is uneven on the surface of the image sensor, uneven brightness, uneven color, and defect pixels can be effectively corrected. In particular, the present embodiment is very useful in the case of a large-sized image sensor.

In addition, according to the above-described first through third exemplary embodiments, the correction value for the defect pixel is changed for each area obtained by dividing the pixel portion of the image sensor. Thus, a defect pixel can be more accurately corrected.

Moreover, in dividing the pixel portion of the image sensor into a plurality of areas, the number of the divided areas is larger in portions around the differential amplifier 130 where the temperature can greatly vary, than that in portions distant from the differential amplifier 130 and a larger number of thermometer pixels are disposed around the differential amplifier 130. Thus, defect pixels can be highly accurately corrected.

In addition, in the above-described exemplary embodiments of the present invention, the temperature sensors are disposed on the same substrate of the image sensor. Accordingly, uneven brightness, uneven color, and defect pixels can be effectively corrected without increasing an apparatus size and manufacturing cost.

Furthermore, the temperature sensors are disposed in the pixel portion of the image sensor. Thus, the temperature can be measured in a close vicinity of each pixel of the image sensor. Accordingly, uneven brightness, uneven color, and defect pixels can be effectively corrected.

Moreover, in the above-described exemplary embodiments of the present invention, light-shielded pixels disposed around an effective pixel portion of the image sensor, are divided into a plurality of areas, and the dark current value of each light-shielded pixels is detected. The temperature of the plural areas is measured based on the dark current value from the plural light-shielded areas, and the correction value for the output from the image sensor is changed according to a result of the temperature measurement with respect to the plural areas.

Thus, even if the temperature is uneven on the surface of the image sensor, uneven brightness, uneven color, and defect pixels can be effectively corrected. In particular, the exemplary embodiments of the present invention are very useful in the case of a large-sized image sensor.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

What is claimed is:

1. An imaging apparatus comprising:
   an image sensor having a plurality of normal pixels which is provided within a pixel area and a plurality of temperature detection pixels which is provided within the pixel area instead of the normal pixels, wherein each of the normal pixels includes a photoelectric conversion sensor and each of the temperature detection pixels includes a temperature sensor; and
   a correction unit configured to correct the image signals output from the plurality of image sensors according to the temperature detected by the plurality of temperature sensors.

2. The imaging apparatus according to claim 1, wherein the correction unit is configured to correct a defect pixel.

3. The imaging apparatus according to claim 1, wherein the correction unit is configured to correct a dark current.

4. The imaging apparatus according to claim 1,
   wherein a pixel portion of the image sensor is divided into a plurality of areas each having the plurality of normal pixels and the plurality of temperature detection pixels, and
   wherein the correction unit corrects image signals output from the image sensor per each of the divided areas.

5. The imaging apparatus according to claim 4, further comprising an amplifier configured to amplify the image signals.

6. The imaging apparatus according to claim 1, further comprising an amplifier configured to amplify the image signals.

7. The imaging apparatus according to claim 1, further comprising a common amplifier configured to amplify both the image signals and the temperature signals from the temperature sensor, wherein the amplifier outputs the image signals at timing different from timing of outputting the temperature signals.

8. The imaging apparatus according to claim 7, wherein the temperature sensor is supplied with a power source voltage when the amplifier outputs the temperature signals, and when the amplifier outputs the image signals, the temperature sensor is not supplied with a power source voltage.

9. The imaging apparatus according to claim 1, further comprising a selection line configured to read the image signals from the photoelectric conversion sensor, wherein the temperature signals are read from the temperature sensor on a same selection line as a selection line for reading the image signals from the photoelectric conversion sensor.

10. An image sensor comprising:
- a plurality of normal pixels which is provided within a pixel area of the image sensor, wherein each of the normal pixels includes a photoelectric conversion sensor; and
- a plurality of temperature detection pixels which is provided within the pixel area instead of the normal pixels, wherein each of the temperature detection pixels includes a temperature sensor.

* * * * *